United States Patent [19]

Boersma

[11] 4,179,024
[45] Dec. 18, 1979

[54] SCRAPER ELEVATOR DRIVE MOUNTING
[75] Inventor: Richard F. Boersma, Springfield, Ill.
[73] Assignee: Fiat-Allis Construction Machinery, Inc., Deerfield, Ill.
[21] Appl. No.: 749,820
[22] Filed: Dec. 13, 1976
[51] Int. Cl.² .............................................. B65G 39/16
[52] U.S. Cl. ..................................... 198/806; 198/834
[58] Field of Search ............... 198/717, 719, 725, 728, 198/735, 806, 834, 813; 37/8

[56] References Cited

U.S. PATENT DOCUMENTS

| | | | |
|---|---|---|---|
| 1,888,309 | 11/1932 | Cramer | 198/813 |
| 3,419,975 | 1/1969 | MacDonald | 198/719 |
| 3,557,473 | 1/1971 | Grossklaus | 37/8 |
| 3,668,794 | 6/1972 | Marquardt et al. | 198/854 |
| 3,695,346 | 10/1972 | Nichols | 198/813 |
| 3,738,031 | 6/1973 | Lott | 37/8 |
| 3,930,323 | 6/1976 | Marold et al. | 198/813 |
| 3,946,859 | 3/1976 | Jeffrey et al. | 198/719 |
| 3,971,146 | 7/1976 | Hyler | 198/834 |

FOREIGN PATENT DOCUMENTS 102685  8/1963  Norway .................................. 198/806

Primary Examiner—Jeffrey V. Nase
Attorney, Agent, or Firm—August E. Roehrig, Jr.; Robert A. Brown; Harvey W. Rockwell

[57] ABSTRACT

A conveyor drive roller mounting system for controlling misalignment of the drive roller by mounting an end of the conveyor drive roller on a resiliently mounted torque arm which permits the drive roller to align with the conveyor path of movement.

5 Claims, 4 Drawing Figures

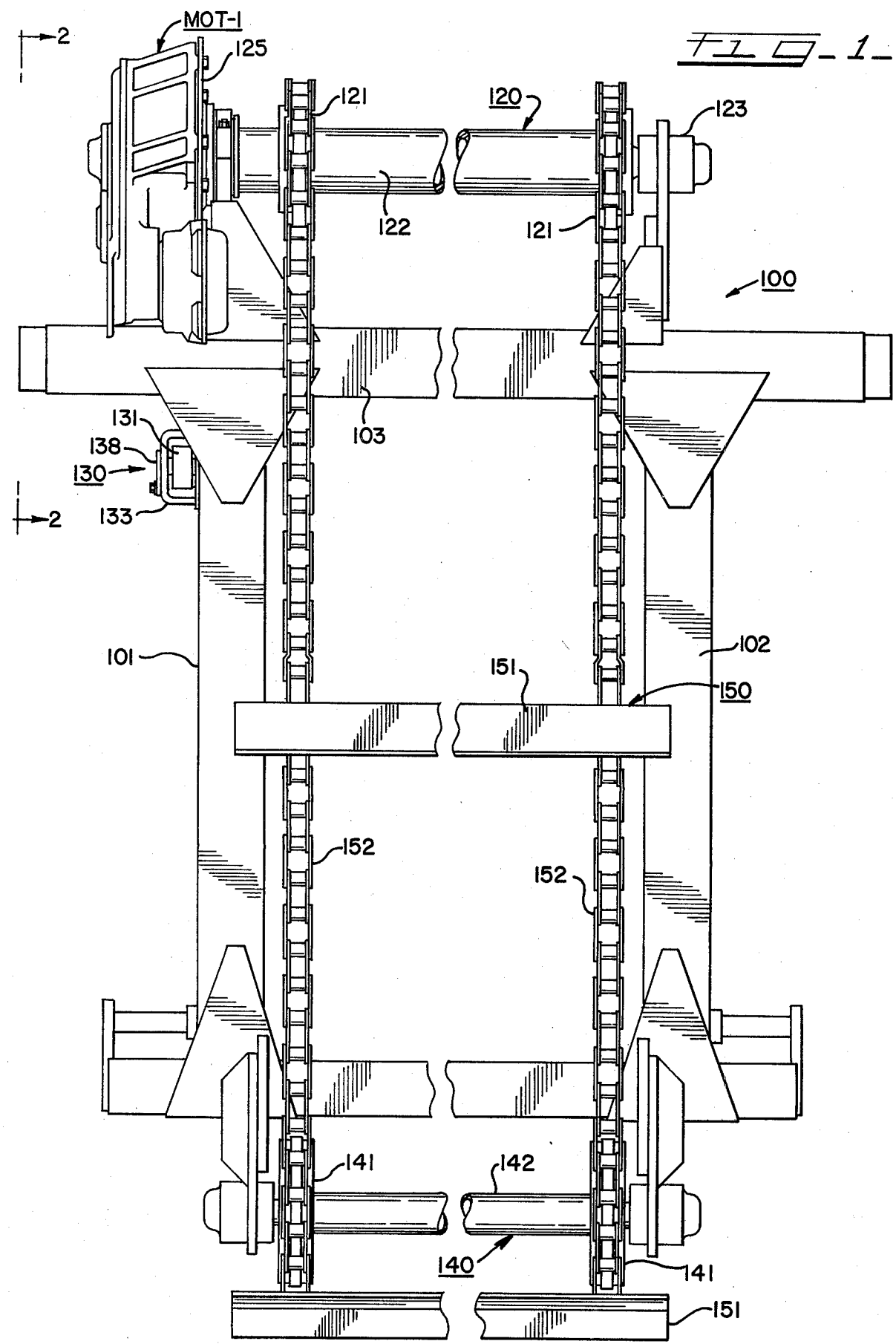

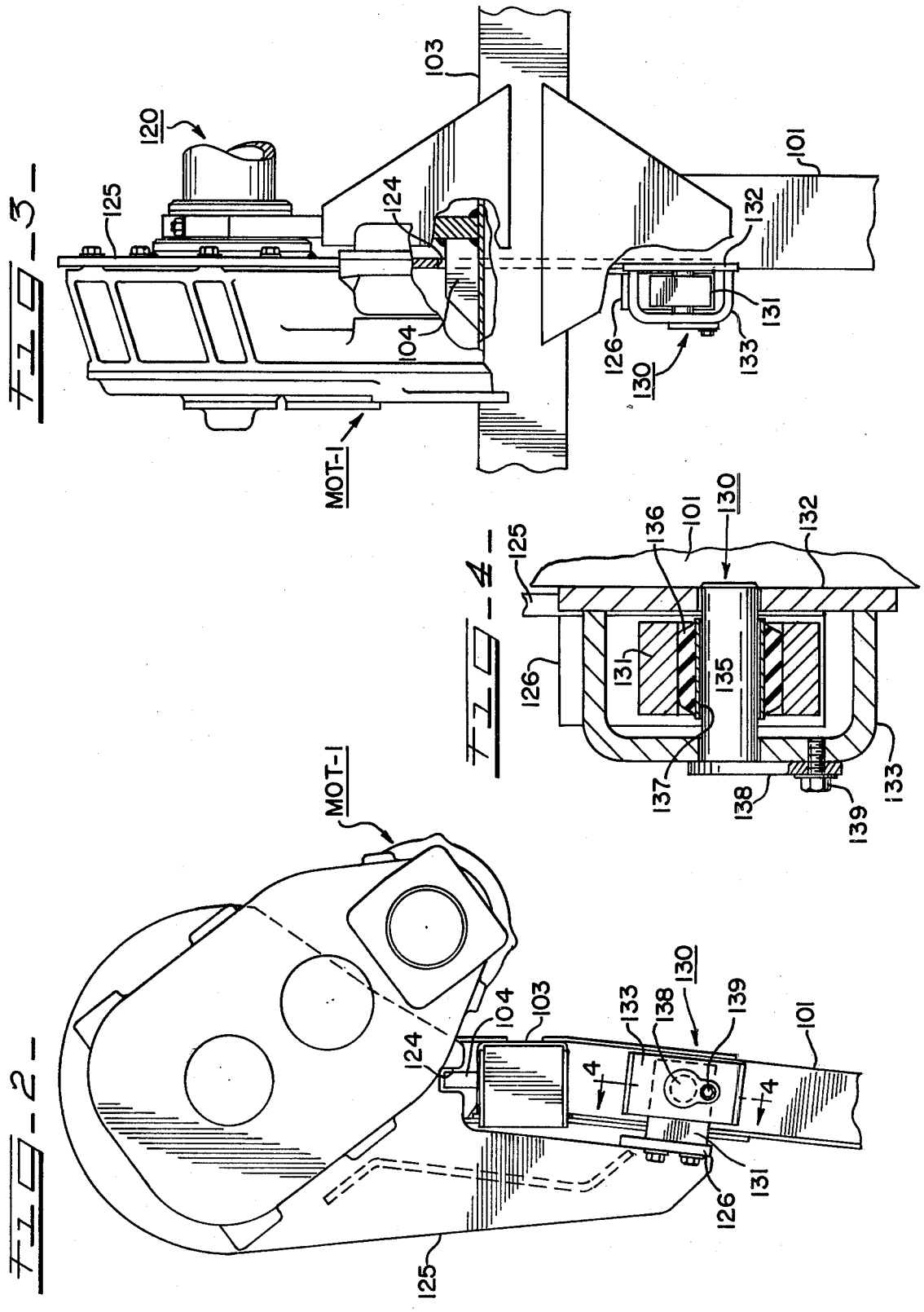

SCRAPER ELEVATOR DRIVE MOUNTING

BACKGROUND OF THE INVENTION

This invention relates in general to conveyor systems and, in particular, to a heavy duty conveyor system such as used as an elevator in earth moving equipment, such as a carry-type scraper, where the elevator is used to move dirt within the scraper bowl.

More specifically, but without restriction to the particular use which is shown and described, this invention relates to a mounting for a conveyor drive roller to control tracking of the conveyor as it passes over and about the supporting rollers.

Control of the path of travel, or tracking, of a conveyor is necessary to prevent the endless belt or web from tracking off the drive or idler rollers, or causing the conveyor web or belt to break. As a conveyor belt moves about the supporting roller in its endless path of movement, lateral force is applied to the conveyor belt causing the belt to creep or travel laterally upon the rollers. This lateral movement of the conveyor belt upon the supporting rollers eventually will cause the belt to track off the rollers or create a lateral force sufficient to cause the belt to rupture. Such lateral force is caused by the non-parallel alignment of the supporting rollers which may occur through the accumulation of manufacturing tolerance errors, or may be the result of damage to the supporting rollers or conveyor frame through operations in the field. Such misalignment is especially troublesome in earth moving equipment where the conveyors carry heavy loads and are frequently subjected to heavy impact from the materials being loaded into the scraper bowl. Due to these unusual problems encountered when using a conveyor in earth moving equipment such as scrapers, the conveyor rollers are frequently misaligned.

Scrapers generally include a box-type structure, referred to as a "bowl", open at its forward end with the bottom or floor of the bowl having an adjustable forward cutting edge adapted to cut a predetermined amount from the upper surface of the ground. The bowl is normally open at its forward end so that the material cut by the cutting edge as it moves through the ground will pass into the rear portion of the bowl. However, as the material is cut it accumulates adjacent to the cutting edge and does not spread uniformly throughout the scraper bowl. Therefore, an elevator or flight-type conveyor must be carried within the bowl and positioned to the rear of the cutting edge to receive the material as it is passed into the forward portion of the bowl to move it both rearwardly and upwardly for more even distribution.

These elevators generally comprise a pair of rigidly joined side frame members extending the full length of the elevator and carrying sprockets at the lower forward and upper rear ends which engage chains of a flight-type conveyor. Such elevators are normally provided with a mounting structure which permits floating action of the elevator over dirt or material entering the bowl to prevent damage to the elevator or cutting edge when a large stone or other object is hit by the scraper. However, while such structure prevents damage by permitting the elevator to float when a large stone is hit, these stones and the like passing into the bowl frequently damage the elevator throwing the conveyor rollers out of alignment.

Even if the equipment were initially properly aligned, in operation such misalignment frequently results in equipment failure and costly down time of the machine in the field. The present invention eliminates these problems by mounting the elevator drive roller to permit alignment with the idler roller so that the conveyor chain will track correctly on the elevator idler rollers and spools. While this invention is believed to have general applications to all types of conveyor systems for convenience of illustration, a preferred embodiment will be described with reference to its use in the elevator of a scraper.

SUMMARY OF THE INVENTION

It is, therefore, an object of this invention to improve conveying systems.

Another object of this invention is to improve conveyor systems for earth moving equipment.

A further object of this invention is to improve alignment devices for establishing tracking of the conveyor belt about the supporting rollers.

Still another object of this invention is to provide an adjustment system for scraper elevators to maintain alignment between the rollers and conveyor chain.

These and other objects are obtained in accordance with the present invention wherein there is provided a conveyor mounting system for controlling misalignment of the conveyor drive sprocket by mounting an end of the conveyor drive roller on a resiliently mounted torque arm which permits the drive roller to establish tracking of the drag chain about the drive sprocket and the idler rollers.

DESCRIPTION OF THE DRAWINGS

Further objects of the invention, together with additional features contributing thereto and advantages accruing therefrom, will be apparent from the following description of one embodiment of the invention when read in conjunction with the accompanying drawings wherein:

FIG. 1 is a horizontal planar view of a portion of a scraper elevator to illustrate the drive roller mounting;

FIG. 2 is an enlarged profile view of a portion of the apparatus shown in FIG. 1 to better illustrate the resilient mounting;

FIG. 3 is an enlarged horizontal planar view of a portion of the drive roller of FIG. 1 to better illustrate portions of the mounting thereof; and FIG. 4 is an enlarged view of a portion of the resilient connection shown in FIGS. 2 and 3.

DESCRIPTION OF A PREFERRED EMBODIMENT

Although this invention may be used in many conveying systems for varying applications, for convenience of illustration the preferred embodiment is described with reference to its use as a scraper elevator. While the scraper does not form any part of this invention it is believed that a general description of a scraper will assist in better understanding of this invention.

A scraper generally comprises a pair of vertical side walls spaced one from the other by a bottom and a rear wall to define a bowl having an open front end. The scraper bowl is supported at its rear end by a pair of wheels, and at its front end by a connection to a draft vehicle such as a tractor which pulls the scraper over the ground. The scraper bowl includes a cutting edge at the front end of the bottom which excavates a predetermined amount of material as the tractor pulls the scraper over the ground.

The amount of material removed from the ground as the scraper passes thereover is controlled by raising or lowering the cutting edge carried at the front end of the bottom. The excavated material will thereafter pass into the scraper bowl as the scraper is pulled forwardly. Since the excavated material has a tendency to pile up and accumulate in the forward portion of the bowl, an endless conveyor or elevator mechanism 100, shown in FIG. 1 and incorporating the subject of this invention, is carried within the bowl adjacent the front end and cutting edge. During excavation, an endless chain conveyor 150 of the conveyor mechanism 100 moves the excavated material upwardly and rearwardly into the bowl to obtain more uniform distribution.

As best shown in FIG. 1, the conveyor or elevator 100 includes drive and tail idler sprocket assemblies 120 and 140, respectively, rotatably journaled between two spaced parallel frame members 101 and 102 to define the run length of the conveyor. The two spaced parallel frame members 101 and 102 form a frame which is supported between the side walls of the scraper bowl. A drag chain conveying system 150 extends about the drive and idler sprocket assemblies and includes a plurality of drag bars or buckets 151 which are appropriately secured to the chains 152.

The tail idler sprocket assembly 140 is rotatably supported between the frame members 101 and 102 at the lowermost end of the conveyor by means of suitably sealed bearings. A pair of idler sprockets 141 are secured to an idler spool 142 to be freely rotatable about the supporting shaft in response to movement of the drag chains 152 through the excavated material.

The drive sprocket assembly 120 includes a pair of sprockets 121 secured to a rotatable spool 122 for driving the drag chain conveyor 150. The drive assembly is supported from the uppermost end of the elevator and is driven by a drive motor MOT-1 operatively connected thereto which supplies the power to the drive sprocket assembly 120 for moving the drag chain conveyor 150 in its endless path of movement through the excavated material. An end of the drive sprocket assembly 120 in driving engagement with the motor MOT-1, hereinafter referred to as the inboard end, is pivotally supported from frame member 101 by means of a resiliently mounted cantilever torque arm 125. The opposite or outboard and end of the drive sprocket assembly 120 is supported on frame member 102 by means of a self-centering bearing assembly 123 which functions with the torque arm 125 to permit the drive sprocket assembly 120 to properly track the drag chain conveyor 150.

The drive motor MOT-1, has its output shaft operatively connected to the inboard end of the drive sprocket assembly 120, and is carried by the frame member 101 on the torque arm 125 to which the motor MOT-1 is secured. Torque arm 125 is supported as a cantilever from the frame member 101 by a resilient connection, generally indicated by reference numeral 130, which functions to permit the inboard or driven end of the drive sprocket assembly 120 to maintain proper tracking alignment of the drag chain conveyor 150. An outwardly extending flange 126 carried at the lower end of the torque arm 125 (best seen in FIG. 2) is secured to a bushing block 131 of the resilient connector 130.

The resilient connector 130 is secured to the conveyor frame member 101 by means of a base plate 132 carrying a generally U-shaped support plate 133. Both the base plate 132 and the support plate 133 are formed with apertures therethrough to receive a coupling pin 135 which functions to operatively join the bushing block 131 with the conveyor frame 101.

In order to allow the torque arm 125 to support the driven end of drive sprocket assembly 120 for maintaining proper alignment of the drag chain conveyor 150, the coupling pin 135 is joined to the bushing block 131 by a bushing of resilient material 136. The bushing 136 is press-fit into an internal bore of the bushing block 131 and the bushing 136 has an internal bore 137 for securing the coupling pin 135 therein preventing relative rotational movement between the pin 135 and the bushing 136. The pin 135 is formed with a head 138 having an aperture through which a bolt 139 passes to secure the pin 135 to the support plate 133 preventing the pin from rotating relative to the plates 132 and 133. Thus, any movement of the torque arm 125 in maintaining proper tracking of the drag chain conveyor 150 will cause the bushing block 131 to move relative to the coupling pin 135 through the resilient bushing 136.

While the length of the cantilever mounted torque arm 125 will permit the drive roller assembly 120 to move sufficiently to compensate for tracking the drag chain conveyor 150 within the limits of resiliency of the bushing 136, a stop lug 104 is secured to the elevator frame 103 to define the limits of movement of the torque arm 125. The stop lug 104 is positioned on the frame 103 to extend within an aperture 124 formed in the torque plate 125. In this manner, the maximum movement of the torque arm is limited by the clearance distance between the lug 104 and the aperture 124.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mounting for a conveyor roller to establish tracking of a conveyor supported for movement in a predetermined endless path of movement upon drive and idler rollers comprising conveyor means supported for movement in a predetermined endless path of movement upon a drive roller and a tail idler roller, a support arm supporting one end of one of said rollers for pivotal movement relative to the endless path of movement of said conveyor means and cantilevered for movement in a plane transverse to the rotational axis of said roller, said support arm being a cantilever resiliently mounted to a frame within which said drive and tail idler rollers rotatably support said conveyor means, and an end of said support arm being fixedly secured to a bushing block supported about a resilient bushing secured to said frame to pivot said roller to a position in alignment with the endless path of movement of said conveyor means to track said conveyor means in said predetermined endless path of movement in response to movement of said conveyor means from said predetermined path of movement.

2. The apparatus of claim 1 further including means secured to the frame and positioned adjacent to and spaced from said support arm for limiting the movement thereof in a plane transverse to the rotational axis of said roller.

3. The apparatus of claim 1 wherein said resilient bushing is secured about a pin supported on the frame such that movement of said bushing block fixedly secured to said support arm will flex said resilient bushing about said pin.

4. The apparatus of claim 3 wherein said pin is fixedly secured to the frame to prevent movement of said pin relative to the frame during movement of said support arm.

5. A conveyor having a drive roller mounting for establishing correct tracking of the conveyor about drive and idler rollers comprising sprocket bearing drive and idler rollers rotatably supported at opposite ends of a frame defining the run length of a conveyor moving in an endless path of movement about said rollers, a chain link conveyor supported about said drive and idler rollers upon said sprockets and carrying a plurality of material conveying members, a drive motor operatively connected to one end of said drive roller and supported from the conveyor frame for effecting movement of said chain link conveyor in an endless path of movement, and a support arm having a support end freely supporting said drive motor and said drive roller for movement in a plane transverse of said drive roller axis and a mounting resiliently mounted to the conveyor frame, said support arm mounting end having a bushing mounted bushing block secured thereto and engaging a coupling pin fixedly secured to the conveyor frame such that movement of said support arm will flex the bushing of said bushing mounted bushing block about said coupling pin to effect correct tracking of said chain link conveyor about the sprockets of said idler roller.

* * * * *